United States Patent [19]

Lautenschläger

[11] Patent Number: 4,576,051
[45] Date of Patent: Mar. 18, 1986

[54] ERGOMETER HAVING AN EDDY CURRENT BRAKE SERVING AS A LOADING DEVICE

[75] Inventor: Peter Lautenschläger, Gonbach, Fed. Rep. of Germany

[73] Assignee: Keiper Dynavit GmbH & Co., Fed. Rep. of Germany

[21] Appl. No.: 601,178

[22] Filed: Apr. 17, 1984

[30] Foreign Application Priority Data

Apr. 28, 1983 [DE] Fed. Rep. of Germany ....... 3315441

[51] Int. Cl.⁴ .............................................. G01L 3/10
[52] U.S. Cl. ................................. 73/862.36; 324/209
[58] Field of Search ..................... 73/131, 130, 862.36, 73/862.17; 324/209

[56] References Cited

U.S. PATENT DOCUMENTS 3,861,206 1/1975 Kawafune et al. ............... 73/862.36
4,414,855 11/1983 Iwasaki ............................ 73/862.36

FOREIGN PATENT DOCUMENTS 8107360 11/1981 Fed. Rep. of Germany.
3139056 4/1983 Fed. Rep. of Germany.
577413 10/1977 U.S.S.R. .......................... 73/862.36

Primary Examiner—Stephen A. Kreitman
Attorney, Agent, or Firm—Wigman & Cohen

[57] ABSTRACT

The present invention relates to an ergometer having an eddy current brake serving as a loading device, comprising a rotatably mounted brake wheel placed into rotation by means of a drive device and having a cylindrical ring made from an electrically conductive material. A stationary magnet system acts as a loading device and has an air gap disposed between the poles of the magnet system directed toward the ring and the ring itself. Depressions in the surface of the brake wheel run laterally to the direction of movement and are provided at one side of the air gap opposite the poles of the magnet system. The magnet system supports a measurement coil permeated by the magnetic flux which closes over the brake wheel. The fluctuations in the magnetic flux resulting from the grooves cause a voltage to be induced in the measurement coil, from which the rotational speed of the brake wheel and the effective braking torque can be calculated.

16 Claims, 2 Drawing Figures

ERGOMETER HAVING AN EDDY CURRENT BRAKE SERVING AS A LOADING DEVICE

BACKGROUND OF THE INVENTION

The invention relates to an ergometer having an eddy current brake which serves as a loading device. The eddy current brake includes a rotatably mounted brake wheel which can be made to rotate by a drive means and has a cylindrical ring of an electrically conductive material as well as a stationary magnet system having poles directed toward the ring. Between the poles and the ring an air gap is present.

In a known ergometer of this type the magnet system is arranged within the cylindrical ring of the brake wheel, so that the flux produced by the magnet system enters into the inner cover surface of the ring and also exits therefrom. Because the ring is heated during operation as a result of the eddy current losses produced therein, and therefore expands, during operation the air gap becomes enlarged. This leads to a decrease in the magnetic flux and thus to a decrease in the brake load. An increase in the temperature of the ring has the same effect. In order to be able to keep the brake load constant, the energizing current to the magnet system must be increased as the temperature rises. The electronic apparatus required for this purpose clearly has an effect on the manufacturing costs of the ergometer.

SUMMARY AND OBJECTS OF THE INVENTION

The object of the invention is to lessen the expense for maintaining the brake load, in spite of a heating of the brake wheel, in an ergometer having an eddy current brake which serves as a loading device.

By arranging the magnet system in such a manner that the magnetic flux produced thereby enters into the outer cover surface of the ring of the brake wheel and also exits therefrom, as the temperature of the ring rises, the air gap between the outer cover surface and the poles of the magnet system decreases. This contrasts with the known ergometers of the type described above, wherein a reduction of the brake load is caused not only as a result of the decrease of the eddy current losses occurring in the ring, but also as a result of the enlarging air gap. According to the present invention, the decrease in the air gap as a result of heating acts counter to the reduction in the eddy current losses resulting from heating with respect to the brake load. It is therefore possible to at least largely compensate one effect against the other and do so automatically, i.e., in spite of a transformation of the eddy currents into lost capacity as a result of a temperature-dependent increasing enlargement of the magnetic flux, which becomes more and more unfavorable as the temperature increases. It is possible to hold the brake load constant independently of the temperature of the brake wheel, without any change in the energizing capacity of the magnet system, i.e. without changing the energizing current in an electromagnet. Therefore, compensating electronic means can be avoided, which has the further advantage that subsequent adjustments resulting from altering electronic components can also be avoided, and a single calibration is sufficient.

A ring made of gray cast pig iron is advantageous both with respect to the effects of heating and with respect to the costs.

In order to precisely adjust the air gap between the magnet system and the ring without difficulty, the magnet system in a preferred embodiment is mounted on a support which extends out from the rotational axis of the brake wheel and beyond the outer cover surface of the ring. By this means the influence of manufacturing tolerances can be kept very small. With respect to the manufacturing expense, it is also advantageous if the ring is fit onto or molded to a spoked wheel.

Since the extent of the compensation of the temperature-dependent transformation of the eddy currents into lost capacity due to the decrease in the size of the air gap is also dependent on the absolute size of the air gap, in an advantageous embodiment the air gap has a size of about 0.2 mm. with an outside diameter of the ring of about 350 mm.

In the known ergometers having an eddy current brake as a loading device, the measurement of the brake capacity requires a significant expense. A further object of the invention, therefore, is to design the ergometer in such a manner that the expense for measuring the brake capacity can be reduced.

The depressions in the surface of the brake wheel at one side of the air gap, with the poles of the magnet system on the other side thereof, result in a temporary reduction in the magnetic flux as they pass by the poles of the magnet system. This flux change induces voltage impulses in the measurement coil. The magnitude of the voltage periods of the impulses is dependent on the effective braking torque, and the impulse frequency is dependent on rotational speed of the brake wheel. Therefore, from the voltage periods of the impulses and their resulting frequency, the braking capacity can be determined. For example, the voltage induced in the measurement coil can be rectified, stabilized and linearized and thereafter supplied to an analog/digital converter. A display can be controlled with the output signal of this A/D converter, the display being calibrated in wattage, so that the displayed value corresponds to the momentary pedal capacity or brake capacity.

In order to hold the losses in the magnet system as low as possible, in spite of the fluctuations in the magnetic flux, it is effective for purposes of the invention to use a core of dynamo sheets for the magnet system.

The depressions in the surface of the brake wheel penetrated by the magnetic flux can have the shape of grooves or bores. It is effective to select the distance between two successive depressions to be relatively large, so that the depressions do not affect the average value of the air gap size. In a preferred embodiment the depressions are therefore arranged so as to be displaced from each other by 90° in the circumferential direction of the brake wheel. Accordingly, four impulses are produced for each rotation of the brake wheel. This low number of impulses is sufficient. In addition, a low number of depressions does not significantly increase the manufacturing costs of the brake wheel.

The invention is described in greater detail below with the aid of an exemplary embodiment illustrated in the drawings.

With the foregoing and other objects, advantages and features of the invention that will become hereinafter apparent, the nature of the invention may be more clearly understood by reference to the following detailed description of the invention, the appended claims and to the several views illustrated in the attached drawings.

DETAILED DESCRIPTION OF A PREFERRED EMBODIMENT

Figure 1:
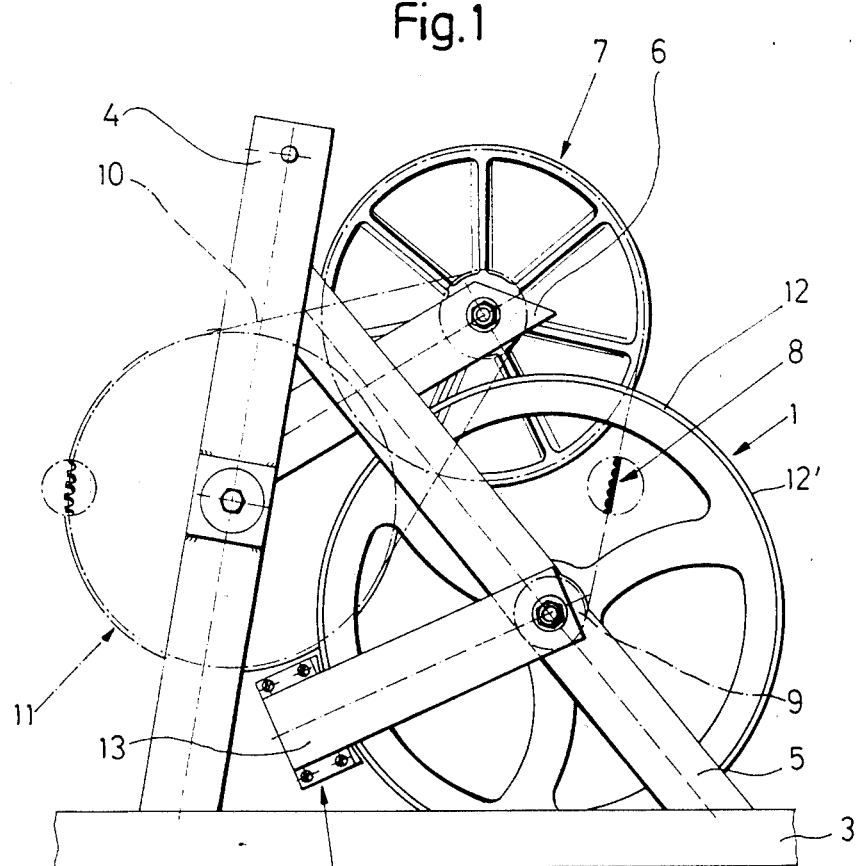
FIG. 1 is a side elevation view of the eddy current brake and a portion of the drive device with a cover removed.

An eddy current brake consisting of a brake wheel 1 and a magnet system 2 act as a loading device for an ergometer. The brake wheel 1, as shown in FIG. 1, is rotatably mounted in a frame with its rotational axis lying horizontal. The frame is formed as a simple welded tubular construction. A support 4 extends upward from a base frame 3. A support (not shown), which is height-adjustable, is provided for a bridge (also not shown) and two beam pairs 5 and 6 which are connected to a support 4. The support is also connected with the base frame 3 and supports the mounting of the brake wheel 1. The beam pair 6 supports a mounting arranged above the brake wheel 1 for a wheel pair 7 of a drive device, by means of which the rotational movement of a drive shaft (not shown), with which the lever arm supporting pedals are connected, is transferred to the brake wheel 1. The rotational movement of the wheel pair 7 is transferred to a coaxial pulley 9 arranged next to the brake wheel 1 and connected thereto so as to rotate therewith, by means of a toothed belt 8, which passes around the larger diameter wheel of the wheel pair 7. The drive of the wheel pair 7 takes place by means of a chain 10, which is guided over the smaller diameter wheel of the wheel pair 7 and a larger diameter chain wheel 11, which is mounted on the support 4. The drive of the chain wheel 11, which takes place in the exemplary embodiment by means of a second chain from the drive shaft via a smaller diameter chain wheel arranged adjacent the chain wheel 11 (said drive not shown).

The brake wheel 1, which is made of gray cast pig iron and has three spokes, as shown in FIG. 1, has a cylindrical ring 12, which forms the exterior limit thereof and is concentric to the rotational axis. In the exemplary embodiment, this ring 12 has an axial length of 20 mm and an outside diameter of about 350 mm. Its thickness is about 6 mm. As a result of the spokes and the size of this ring 12, the brake wheel has a relatively large gyrating mass, which assures a comfortable, jerk-free pedaling in the use of the ergometer.

The magnet system 2, as shown in FIG. 1, is secured outside the ring 12 on a beam 13 by means of screws in the exemplary embodiment. The beam extends from the mounting of the brake wheel 1 radially outward beyond the ring 12, and in the exemplary embodiment is securely connected with the other elements of the frame, but could also be supported, for example, on a force absorber.

Figure 2:
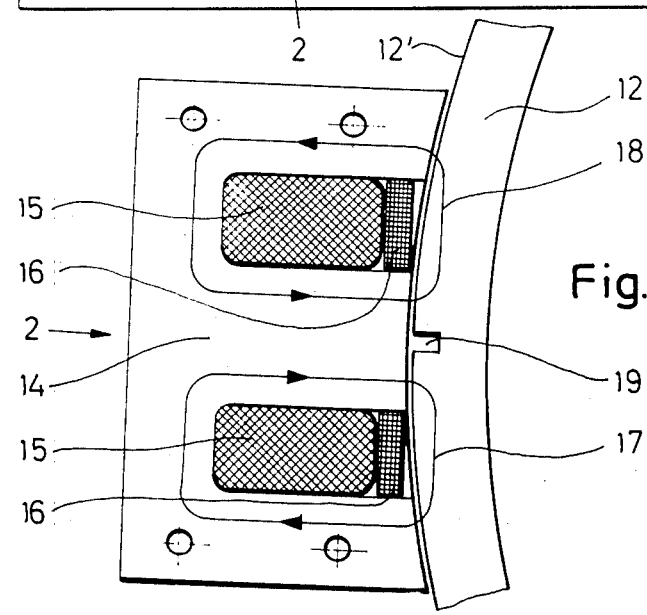
FIG. 2 is a detailed section through the magnet system of the eddy current brake and a portion of its brake wheel.

The magnetic system 2, as shown in FIG. 2, has an E-core 14 made of dynamo sheets. The three shanks of the E-core 14 are directed toward the outer cover surface 12' of the ring 12, in such a manner that the longitudinal axis of the center shank is directed toward the rotational axis of the brake wheel 1, and thereby stands perpendicularly with respect to the outer cover surface 12'. The free ends of the shanks of the E-core 14, which form the poles, are adapted to the curvature of the outer cover surface 12', and the E-core 14 is secured to the beam 13 such that the air gap between the outer cover surface 12' and the three poles of the E-core 14 has a size of 0.2 mm.

The center chank of the E-core 14 is surrounded by an energizing coil 15, which fills the greatest portion of the two windows of the E-core 14. A measurement coil 16 is arranged next to this energizing coil. In the exemplary embodiment this measurement coil 16 lies next to the side of the energizing coil 15 facing the outer cover surface 12'. However, it could also lie on the other side, inside or outside the energizing coil 15, since its purpose is to convert fluctuations in the magnetic flux into a measurement voltage.

Fluctuations in the magnetic flux produced by the magnet system 2, the field lines of which are of the shape schematically represented in FIG. 2 by the lines 17 and 18, arise as the brake wheel 1 rotates. Grooves 19 are provided in the ring 12 and are distributed uniformly about the circumference of the ring 21. In the exemplary embodiment there are four grooves 19, displaced relative to each other by 90°. The grooves 19 are open toward the outer cover surface 12', extend over the entire axial length of the ring 12, and, in the exemplary embodiment, have a width of 3 mm and a depth of 4 mm.

When the grooves 19 move past the poles of the E-core 14, the effective size of the air gap is significantly enlarged, which results in a measureable decrease in the magnetic flux. Because of the small number of grooves 19, the braking capacity of the eddy current brake is hardly decreased at all.

When the ergometer is to be used, the magnet system 2 is energized. The energizing current flowing through the energizing coil 15 is then adjusted to provide the desired braking torque. Because the ring 12 moves through the magnetic field produced by the magnet system 2 when the brake wheel 1 rotates, eddy currents are induced in the ring 12, which result in the desired braking torque and also lead to a heating of the brake wheel and particularly of the ring 12. The heating of the ring 12, first of all results in the lost capacity produced by the eddy currents in the ring growing smaller unless a reduction in this lost capacity is somehow countered. Secondly, the heating of the ring 12 causes an expansion thereof, so that with rising temperatures, the air gap between the outer cover surface 12' and the poles of the E-core 14 grows smaller. At a constant current through the energizing coil 15, this reduction in the size of the air gap results in an increase in the magnetic flux, to such a degree that the influence of the heating of the ring 12 compensates for the increase in lost capacity. Therefore, even during the heating process of the brake wheel, the braking capacity remains at least nearly constant, so that additional, expensive measures to maintain a constant braking capacity can be avoided.

The fluctuations in the magnetic flux resulting from the grooves 19 cause a voltage to be induced in the measurement coil 16 which has an interrupted curve similar to a sine curve, and can therefore be compared with an impulse-like voltage. The impulse sequence or impulse frequency is proportional to the rotational speed of the brake wheel 1. The voltage time area of the impulse provides a measurement for the effective braking torque. Therefore, if the impulse-like voltage induced in the measurement coil 16 is rectified, stabilized and linearized and is then supplied to an analog/digital converter, as is the case in the exemplary embodiment, then the output signal of the A/D converter can be used to control a display which indicates the instantaneous braking capacity, for example in watts. By taking into account the efficiency of the drive device, the instantaneous pedal peformance can also be displayed.

Although only preferred embodiments are specifically illustrated and described herein, it will be appreciated that many modifications and variations of the present invention are possible in light of the above teachings and within the purview of the appended claims without departing from the spirit and intended scope of the invention.

What I claim is:

1. An ergometer having an eddy current brake serving as a loading device, comprising:
    a rotatably mounted brake wheel placed into rotation by means of a drive device and having a cylindrical ring made from an electrically conductive material; and
    a stationary magnet system having an air gap disposed between the poles of the magnet system directed toward the ring and the ring itself;
    wherein the air gap is provided between the outer cover surface of the ring and the poles of the magnet system facing the outer cover surface;
    wherein depressions running laterally to the direction of movement are provided in the surface of the brake wheel arranged at one side of the air gap opposite the poles to the magnet system, and that the magnet system supports a measurement coil permeated by the magnetic flux which closes over the brake wheel.

2. The ergometer according to claim 1, wherein the ring is made of gray cast pig iron.

3. The ergometer according to claim 1, wherein the magnet system is connected to a support which extends radially outward from the rotational axis of the brake wheel beyond the outer cover surface of the ring.

4. The ergometer according to claim 1, wherein the ring is shaped to fit on a spoked wheel.

5. The ergometer according to claim 1, wherein the ring has an outside diameter of about 350 mm and the air gap is about 0.2 mm.

6. The ergometer according to claim 1, wherein the measurement coil is provided in addition to an energizing coil.

7. The ergometer according to claim 1, wherein the depressions have the shape of grooves.

8. The ergometer according to claim 1, wherein the depressions have the shape of bores.

9. The ergometer according to claim 1, wherein the depressions are arranged so as to be uniformly distributed about the circumference of the brake wheel, and are displaced 90° relative to each other.

10. The ergometer according to claim 1, wherein the magnet system has a sheet-metal covered core.

11. An ergometer having an eddy current brake serving as a loading device, comprising:
    a rotatably mounted brake wheel placed into rotation by means of a drive device and having a cylindrical ring made from an electrically conductive material; and
    a stationary magnet system having an air gap disposed between the poles of the magnet system directed toward the ring and the ring itself;
    wherein depressions running laterally to the direction of movement are provided in the surface of the brake wheel disposed at one side of the air gap opposite the poles of the magnet system, and that the magnet system supports a measurement coil permeated by the magnetic flux which closes over the brake wheel.

12. The ergometer according to claim 11, wherein the measurement coil is provided in addition to the energizing coil.

13. The ergometer according to claim 11, wherein the depressions have the shape of grooves.

14. The ergometer according to claim 11, wherein the depressions have the shape of bores.

15. The ergometer according to claim 11, wherein the depressions are arranged so as to be uniformly distributed about the circumference of the brake wheel, and are preferrably displaced by 90° relative to each other.

16. The ergometer according to claim 11, wherein the magnet system has a sheet metal covered core.

* * * * *